(12) United States Patent
Hagiwara et al.

(10) Patent No.: US 11,045,886 B2
(45) Date of Patent: Jun. 29, 2021

(54) CUTTING INSERT AND INDEXABLE CUTTING TOOL

(71) Applicant: MITSUBISHI MATERIALS CORPORATION, Tokyo (JP)

(72) Inventors: Takayuki Hagiwara, Tokyo (JP); Shigeru Ishimori, Tokyo (JP); Kiichi Yamazaki, Tokyo (JP); Jun Kitajima, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/068,684

(22) PCT Filed: Jan. 12, 2017

(86) PCT No.: PCT/JP2017/000764
§ 371 (c)(1),
(2) Date: Jul. 9, 2018

(87) PCT Pub. No.: WO2017/122715
PCT Pub. Date: Jul. 20, 2017

(65) Prior Publication Data
US 2019/0015911 A1    Jan. 17, 2019

(30) Foreign Application Priority Data

Jan. 13, 2016    (JP) .............................. JP2016-004645

(51) Int. Cl.
*B23C 5/06*    (2006.01)
*B23C 5/20*    (2006.01)

(52) U.S. Cl.
CPC ................ *B23C 5/207* (2013.01); *B23C 5/06* (2013.01); *B23C 2200/0483* (2013.01);
(Continued)

(58) Field of Classification Search
CPC ............ B23C 5/207; B23C 5/202; B23C 5/20; B23C 5/06; B23C 5/2213; B23C 5/2221;
(Continued)

(56) References Cited

U.S. PATENT DOCUMENTS 3,289,271 A    12/1966    Stier
3,490,117 A    1/1970    Hertel
(Continued)

FOREIGN PATENT DOCUMENTS

DE    202011050704 U1 * 10/2012    ............... B23C 5/06
JP    2003275920 A  *  9/2003
(Continued)

OTHER PUBLICATIONS

International Search Report dated Mar. 28, 2017, issued for PCT/JP2017/000764 and English translation thereof.
(Continued)

*Primary Examiner* — Ryan C Rufo
(74) *Attorney, Agent, or Firm* — Locke Lord LLP

(57) ABSTRACT

A cutting insert has an insert major body which includes two hexagonal faces facing each other and six side faces arranged around the two hexagonal faces, and is rotationally symmetrical at 120° intervals about an insert center line passing through centers of the two hexagonal faces and inversely symmetrical in front and back with respect to the two hexagonal faces, wherein a major cutting edge and an minor cutting edge are alternately formed in a circumferential direction in the single hexagonal face at twelve intersecting ridgeline portions at which the hexagonal faces and the side faces intersect, the major cutting edge is formed to be located at an intersecting ridgeline portion with one hexagonal face while the minor cutting edge is formed to be located at an intersecting ridgeline portion with the other hexagonal face at a single side face.

4 Claims, 11 Drawing Sheets

(52) U.S. Cl.
CPC .... *B23C 2200/125* (2013.01); *B23C 2200/28* (2013.01); *B23C 2200/365* (2013.01)

(58) Field of Classification Search
CPC ..... B23C 2200/0411; B23C 2200/0483; B23C 2200/208; B23C 2200/24; B23C 2200/28; B23C 2200/365; B23C 2200/125; B23C 2200/286; B23B 2200/0409
See application file for complete search history.

(56) References Cited

U.S. PATENT DOCUMENTS

| | | | |
|---|---|---|---|
| 5,695,303 A | 12/1997 | Boianjiu et al. | |
| 5,904,450 A | 5/1999 | Satran et al. | |
| 10,144,070 B2* | 12/2018 | Burtscher | B23C 5/06 |
| 2010/0080662 A1* | 4/2010 | Satran | B23C 5/2213 |
| | | | 407/40 |
| 2011/0236147 A1* | 9/2011 | Bodewig | B23C 5/207 |
| | | | 409/132 |
| 2012/0070240 A1* | 3/2012 | Ishi | B23C 5/06 |
| | | | 407/42 |
| 2012/0301235 A1* | 11/2012 | Yoshioka | B23C 5/06 |
| | | | 407/100 |
| 2013/0101364 A1 | 4/2013 | Dufour et al. | |
| 2013/0129430 A1* | 5/2013 | Bhagath | B23B 27/007 |
| | | | 407/33 |
| 2013/0129432 A1 | 5/2013 | Jaeger et al. | |
| 2013/0156515 A1* | 6/2013 | Satran | B23C 5/207 |
| | | | 407/48 |
| 2013/0170915 A1* | 7/2013 | Saji | B23B 27/141 |
| | | | 407/33 |
| 2014/0334890 A1 | 11/2014 | Takahashi | |
| 2015/0190868 A1* | 7/2015 | Koifman | B23C 5/207 |
| | | | 407/11 |
| 2016/0256941 A1* | 9/2016 | Brunetto | B23C 5/207 |
| 2016/0375506 A1 | 12/2016 | Koike et al. | |
| 2017/0014914 A1* | 1/2017 | Yamaguchi | B23C 5/20 |
| 2018/0065195 A1* | 3/2018 | Riviere | B23C 5/207 |

FOREIGN PATENT DOCUMENTS

| | | | | |
|---|---|---|---|---|
| JP | 2006-082168 A | | 3/2006 | |
| JP | 2010-523352 A | | 7/2010 | |
| JP | 2013-107198 A | | 6/2013 | |
| JP | 2013121639 A | * | 6/2013 | |
| JP | 2014-501632 A | | 1/2014 | |
| WO | 2008/120186 A1 | | 10/2008 | |
| WO | WO-2010093120 A2 | * | 8/2010 | ........... B23C 5/2221 |
| WO | 2012/099355 A1 | | 7/2012 | |
| WO | 2013/088851 A1 | | 6/2013 | |
| WO | WO-2014081010 A1 | * | 5/2014 | ............... B22F 7/06 |
| WO | 2015174200 A1 | | 11/2015 | |

OTHER PUBLICATIONS

European Search Report dated Jul. 26, 2019 for Application No. 17738469.0.
European Search Report dated Jul. 26, 2019 for Application No. 173384693.0.

* cited by examiner

CUTTING INSERT AND INDEXABLE CUTTING TOOL

TECHNICAL FIELD

The present invention relates to a cutting insert that is detachably attached to an insert mounting seat formed at an outer periphery of a distal end portion of a tool major body, which is rotated around its axial line, to perform a cutting (milling) process such as a process of ramping a work material, and a indexable cutting tool to which such a cutting insert is detachably attached.

Priority is claimed on Japanese Patent Application No. 2016-004645, filed Jan. 13, 2016, the content of which is incorporated herein by reference.

BACKGROUND ART

For example, as such a cutting insert and indexable cutting tool, Patent Document 1 discloses a cutting insert having a triangular (irregular hexagonal) shape, the cutting insert including two identical end faces facing opposite directions and a surrounding face extending therebetween, an intermediate face positioned between the end faces and configured to divide the cutting insert into two equal parts, and a cutting edge formed at intersections between the end faces and the surrounding face and having six major cutting edges and six minor cutting edges which are continuously joined, wherein a major flank face of the surrounding face forms an obtuse angle in the insert with a first reference face parallel to the intermediate face, and an minor flank face of the surrounding face forms an acute angle in the insert with a second reference face parallel to the intermediate face, and a indexable cutting tool to which the cutting insert is attached.

Such a cutting insert is attached to a tool major body in such a way that a single end face is directed in a milling direction of the tool major body, the major cutting edge of the single end face is made to protrude from an outer peripheral portion of a distal end of the tool major body to a distal end side, and an minor cutting edge, which is adjacent to the major cutting edge, is made to protrude from an inner peripheral portion of the distal end of the tool major body to the distal end side, so that the intermediate face is inclined in a tool milling direction from the distal end side toward a rear end side of the tool major body, and a clearance angle is given to a major flank face and an minor flank face of the protruding major cutting edge and minor cutting edge. Thus, a indexable cutting tool (milling tool) to which the cutting insert is attached is able to perform a general planar milling process using the major cutting edge by feeding the tool major body in a direction perpendicular to an axial line and a ramping process using the minor cutting edge by obliquely feeding the tool major body toward a distal end side in the axial direction.

CITATION LIST

Patent Literature

[Patent Document 1]
Japanese Unexamined Patent Application, First Publication No. 2010-523352 (A)

DISCLOSURE OF INVENTION

Technical Problem

Here, in such a cutting insert, in order to secure a number of uses of a cutting edge in a single insert major body, the two end faces are formed to be rotationally symmetrical at 120° intervals about an insert center line passing through the centers of the two end faces, and are formed to be inversely symmetrical in front and back. Therefore, an acute angle in the insert of the minor flank face of the minor cutting edge which is adjacent to the major cutting edge in a circumferential direction of the major cutting edge in a single end face is equal to an acute angle in the insert of the minor flank face of the minor cutting edge which is located on the other side of the major cutting edge in an end face opposite the former end face.

However, in the cutting insert described in Patent Document 1, the major flank face and the minor flank face of the surrounding face form a supplementary angle. That is, the sum of the obtuse angle in the insert of the major flank face and the acute angle in the insert of the minor flank face is 180° in a single surrounding face. Because of this, when the acute angle in the insert is made small in order to secure the clearance angle of the minor flank face during the ramping process, the obtuse angle in the insert of the major flank face becomes larger, conversely, and the major flank face interferes with the work material unless the intermediate face is attached to be inclined more. Thus, axial rake angles of the major cutting edge and the minor cutting edge are increased toward the negative angle side, deterioration of the cutting performance is caused, and an increase in cutting resistance is caused as a result.

The present invention has been made in view of the above circumstances, and an object of the present invention is to provide a cutting insert capable of not causing deterioration of the cutting quality due to a decrease in an axial rake angle of a major cutting edge or an minor cutting edge and preventing an increase in cutting resistance even in a case in which a clearance angle of an minor flank face is secured during the ramping process, and a indexable cutting tool in which the cutting insert is detachably attached to a tool major body.

Solution to Problem

In order to achieve the aforementioned objects, a cutting insert of one aspect of the present invention (hereinafter referred to as "cutting insert of the present invention") has an insert major body including two hexagonal faces facing each other and six side faces arranged around the two hexagonal faces, wherein the insert major body is formed to be rotationally symmetrical at 120° intervals about an insert center line passing through the centers of the two hexagonal faces, and is formed to be inversely symmetrical in front and back with respect to the two hexagonal faces, a major cutting edge and an minor cutting edge are alternately formed in a circumferential direction of the hexagonal face in the single hexagonal face at twelve intersecting ridgeline portions at which the two hexagonal faces and the six side faces intersect, the major cutting edge is formed to be located at an intersecting ridgeline portion with one hexagonal face while the minor cutting edge is formed to be located at an intersecting ridgeline portion with the other hexagonal face at a single side face, a major flank face connected to the major cutting edge and an minor flank face connected to the minor cutting edge are formed at the side face, and the major flank face and the minor flank face are concavely folded at a cross-section along the insert center line.

A indexable cutting tool of another aspect of the present invention (hereinafter referred to as "indexable cutting tool of the present invention") has an insert mounting seat formed at an outer periphery of a distal end portion of a tool major body which is rotated around its axial line, and the cutting insert having the above-described constitution is detachably attached to the insert mounting seat in such a way that a single hexagonal face of the insert major body is directed in a tool milling direction, and, of two major cutting edges and minor cutting edges adjacent in the circumferential direction of the single hexagonal face, the major cutting edge is made to protrude toward the outer peripheral side of the distal end of the tool major body, and the minor cutting edge is made to protrude toward an inner peripheral side of the distal end of the tool major body.

In the cutting insert having the above-described constitution, a major cutting edge and an minor cutting edge are alternately arranged between the two hexagonal faces in the circumferential direction of the hexagonal faces at the intersecting ridgeline portions between the two hexagonal faces and the six side faces of the insert major body, and a major flank face connected to the major cutting edge and an minor flank face connected to the minor cutting edge are formed at each side face. However, since the major flank face and the minor flank face are concavely folded at the cross-section along the insert center line, even when an minor flank face angle formed by the minor flank face with respect to a plane which is perpendicular to the insert center line (the acute angle in an insert in Patent Document 1) is made small in order to secure a clearance angle of the minor flank face at the time of attaching the cutting insert to the indexable cutting tool having the above-described constitution, a major flank face angle formed by the major flank face (the obtuse angle in the insert in Patent Document 1) is not increased as a result.

Because of this, according to the cutting insert having the above-described constitution, since the sum of the major flank face angle and the minor flank face angle at a single side face can be made smaller than 180°, a large clearance angle can also be given to the minor flank face while securing the clearance angle of the major flank face even when the plane, which is perpendicular to the insert center line, is not inclined much in the tool milling direction toward the rear end side of the tool major body for a ramping process. Therefore, since the axial rake angles of the major cutting edge and the minor cutting edge are not increased toward the negative angle side in a state in which the cutting insert is attached to the tool major body, the major cutting edge and the minor cutting edge can demonstrate sharp cutting performance, and an increase in cutting resistance can be prevented.

When the minor cutting edge formed at the single side face is formed to protrude to the outside of the insert major body more than the major cutting edge when viewed from a direction facing the hexagonal face along the insert center line, in a case in which the minor cutting edge is directed toward the outer peripheral side of the tool major body and a major cutting edge adjacent to the minor cutting edge is made to protrude to the outer peripheral side of the distal end of the tool major body in a single hexagonal face for the minor cutting edge and the major cutting edge to be used in cutting, a sufficient outer peripheral clearance amount can also be secured for the minor flank face directed toward the outer peripheral side and the major flank face concavely folded thereto. Because of this, even in the case of performing a deep cutting process, a ramping process, or an engraving process in which even a distal end portion of the minor cutting edge directed toward the outer peripheral side of the tool major body is used in cutting, since a radial rake angle of the minor cutting edge does not have to be made larger toward the negative angle side, it is possible to ensure sharp cutting performance and reduce the cutting resistance.

Although a major rake face connected to the major cutting edge and an minor rake face connected to the minor cutting edge are formed at the two hexagonal faces, by making a rake angle formed by the minor rake face larger than the rake angle formed by the major rake face toward the negative angle side with respect to the plane which is perpendicular to the insert center line at the cross-section along the insert center line, a edge angle of the minor cutting edge can be prevented from becoming too small even in a case in which, as described above, a large clearance angle is given to the minor flank face. Because of this, it is possible to secure a cutting edge strength of the minor cutting edge and avoid occurrence of chipping or defects in the minor cutting edge during a ramping process.

Particularly, in the case in which, as described above, the rake angle of the minor rake face is made larger than the rake angle of the major rake face toward the negative angle side, by forming the major cutting edge to protrude in the direction of the insert center line more than the minor cutting edge in a side view that is viewed from a direction facing the two side faces adjacent in the circumferential direction, it is possible to smoothly connect inner peripheries of the major rake face and the minor rake face at an inner peripheral side of the hexagonal face. Because of this, it is possible to smoothly guide chips generated by the major cutting edge and the minor cutting edge to the inner peripheral side of the hexagonal face and discharge the chips during a ramping process as well as a planar milling process.

When attaching such a cutting insert to the insert mounting seat, a hexagonal face directed toward a side opposite the tool milling direction of the insert major body is brought into close contact with a bottom face directed in the tool milling direction of the insert mounting seat, and side faces other than the side faces at which the major cutting edge and the minor cutting edge used in cutting are formed are brought into contact with a wall face of the insert mounting seat for the insert major body to be clamped by a clamp screw or the like.

In this case, when the minor flank face of the side faces is brought into contact with the wall face, since there is a risk of damage when, as described above, a large clearance angle is given to the minor flank face, the major flank face located in the tool milling direction is brought into contact with the wall face. However, in such a case, since, when the major flank face angle of the major flank face is an obtuse angle, an angle of the wall face of the insert mounting seat with respect to the bottom face can be set to be an acute angle, it is possible to prevent lifting and the like of the insert major body due to the cutting resistance. Particularly, in the case in which the major flank face is brought into contact with the wall face of the insert mounting seat in this manner, since a large contact area with the wall face of the insert mounting seat can be ensured by making a width of the major flank face larger than a width of the minor flank face in the direction of the insert center line, it is possible to more reliably attach the insert major body to the insert mounting seat.

Advantageous Effects of Invention

As described above, according to the present invention, since, even when a clearance angle of an minor flank face is made large, a clearance angle of a major flank face is not decreased as a result, a major cutting edge and an minor cutting edge can demonstrate sharp cutting performance during a ramping process, and thus an increase in cutting resistance can be prevented.

BEST MODE FOR CARRYING OUT THE INVENTION

Figure 1:
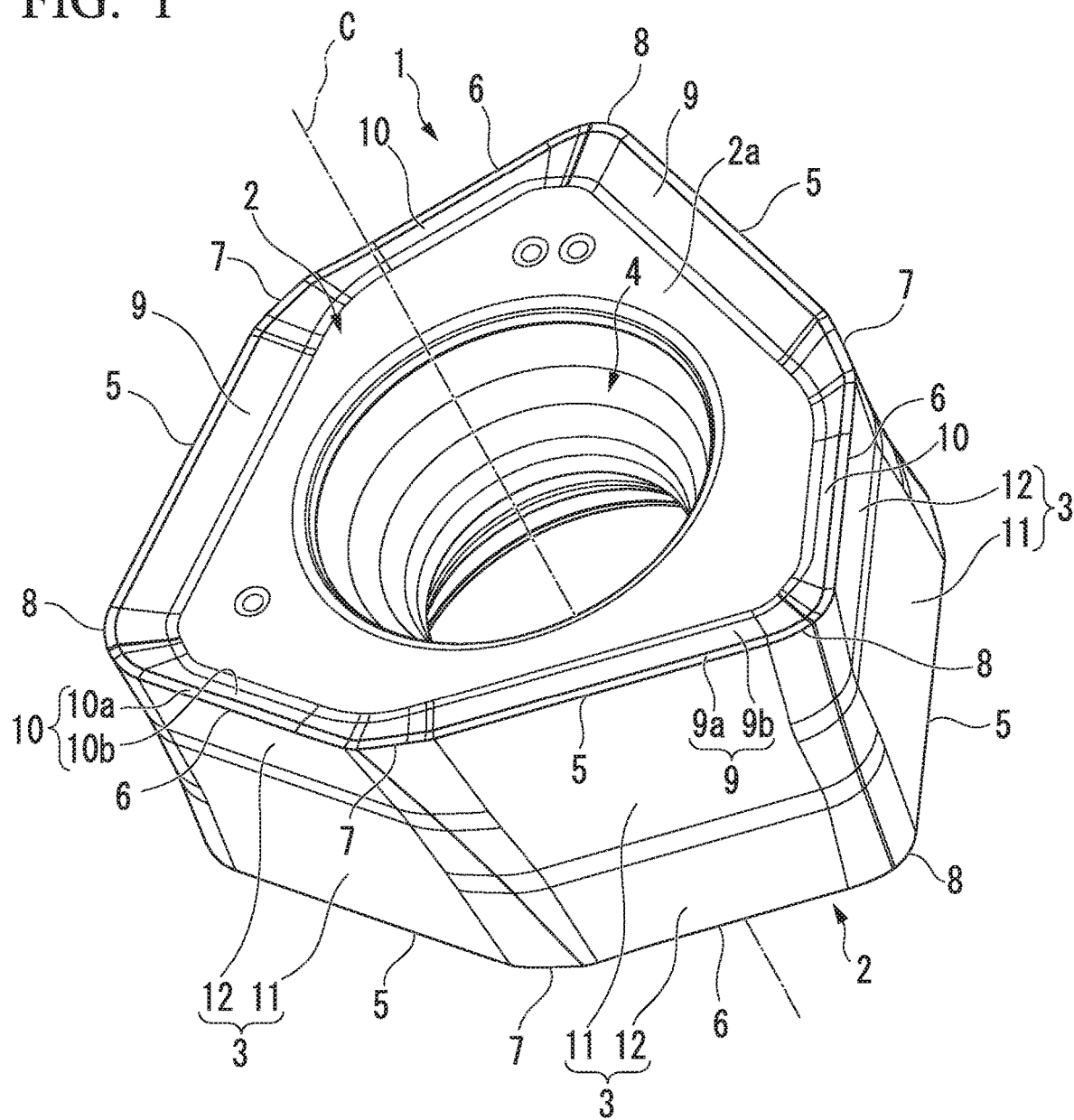
FIG. 1 is a perspective view showing an embodiment of a cutting insert of the present invention.

FIGS. 1 to 6 show an embodiment of a cutting insert of the present invention, and FIGS. 7 to 12 show an embodiment of a indexable cutting tool of the present invention. The cutting insert of the present embodiment has an insert major body 1 that is formed in the shape of an irregular hexagonal plate with a hard material such as a sintered hard alloy and includes two hexagonal faces 2 facing each other and six side faces 3 arranged around the two hexagonal faces 2. A mounting hole 4 that has a circular cross-section and passes through the insert major body 1 is opened at the center of the two hexagonal faces 2. The insert major body 1 is formed to be rotationally symmetrical at 120° intervals about an insert center line C passing through the center of the mounting hole 4 and is formed to be inversely symmetrical in front and back with respect to the two hexagonal faces 2.

A major cutting edge 5 and an minor cutting edge 6 are alternately formed in a circumferential direction of the hexagonal face 2 in the single hexagonal face 2 at twelve intersecting ridgeline portions at which the two hexagonal faces 2 and the six side faces 3 intersect. The major cutting edge 5 is formed to be located at an intersecting ridgeline portion with one hexagonal face 2 while the minor cutting edge 6 is formed to be located at an intersecting ridgeline portion with the other hexagonal face 2 at a single side face 3. That is, the major cutting edges 5 and the minor cutting edges 6 are alternately arranged between the two hexagonal faces 2 in the circumferential direction of the hexagonal faces 2. In the present embodiment, the major cutting edges 5 and the minor cutting edges 6 are formed in a linear shape on planes P5 and P6, respectively, which are perpendicular to the insert center line C.

A wiper edge 7 and a corner edge 8 are formed between the major cutting edge 5 and the minor cutting edge 6 which are adjacent to each other in the circumferential direction of the hexagonal faces 2. The cutting insert of the present embodiment is a right-hand-gripped cutting insert that includes the wiper edge 7 formed between the major cutting edge 5 and the minor cutting edge 6 and the corner edge 8 formed between the minor cutting edge 6 and the major cutting edge 5, clockwise when viewed from a direction facing the hexagonal face 2. When viewed from the direction facing the hexagonal face 2, the wiper edge 7 is formed in a linear shape that intersects the major cutting edge 5 and the minor cutting edge 6 at an obtuse angle or a convexly curved shape having a sufficiently large radius, and the corner edge 8 is formed in a convexly curved shape such as a convex arc coming into contact with the major cutting edge 5 and the minor cutting edge 6 which are adjacent to each other.

When viewed from the direction facing the hexagonal face 2, the major cutting edges 5 and the minor cutting edges 6, which are adjacent to each other with the wiper edge 7 and the corner edge 8 interposed therebetween, extend in directions in which the major cutting edges 5 and the minor cutting edges 6 intersect each other at an obtuse angle. An angle at which the major cutting edge 5 and the minor cutting edge 6 which are adjacent with the wiper edge 7 interposed therebetween intersect is larger than an angle at which the major cutting edge 5 and the minor cutting edge 6 which are adjacent with the corner edge 8 interposed therebetween intersect. Likewise, when viewed from the direction facing the hexagonal face 2, a length of the major cutting edge 5 is longer than a length of the minor cutting edge 6, and the wiper edge 7 and the corner edge 8 is shorter than the minor cutting edge 6.

Figure 3:
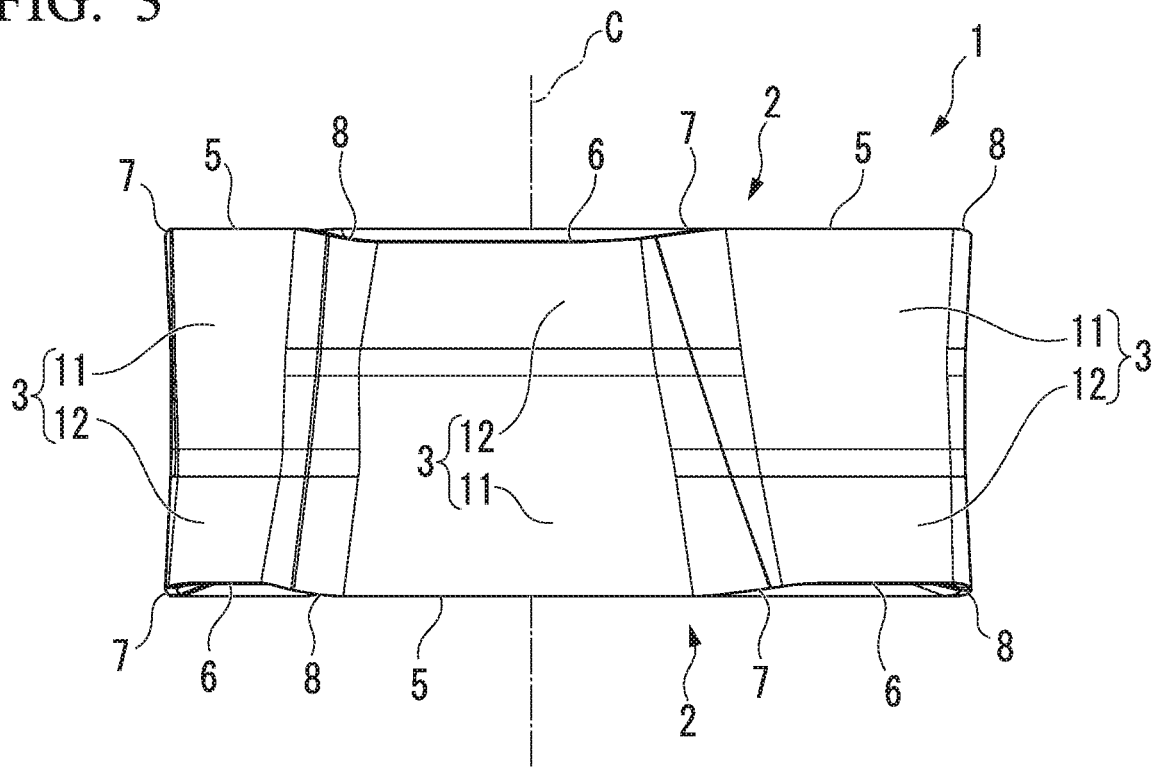
FIG. 3 is a side view in a direction of an arrow W in FIG. 2.
Figure 4:
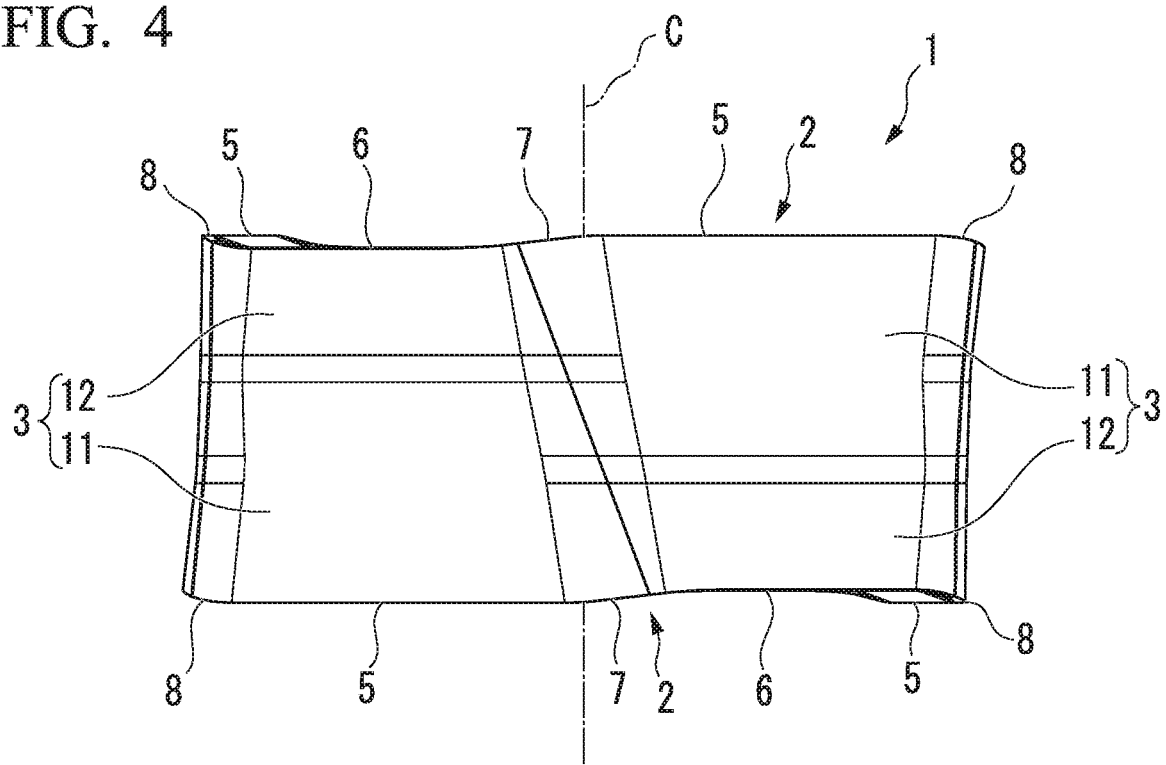
FIG. 4 is a side view in a direction of an arrow X in FIG. 2.

In the present embodiment, as shown in FIGS. 3 and 4, in a side view that is viewed from a direction facing two side faces 3 adjacent in the circumferential direction, the major cutting edge 5 protrudes more than the minor cutting edge 6 in the direction of the insert center line C (for example, the major cutting edge 5 protrudes within the range of 1% to 15% of a thickness of the insert major body, and more preferably, within the range of 2% to 8% thereof). That is, the plane P5, which is perpendicular to the insert center line C, at which the major cutting edge 5 is located is located further outward in the direction of the insert center line C than the plane P6 at which the minor cutting edge 6 is located.

In this way, the wiper edge 7 and the corner edge 8 are inclined to connect both end portions of the major cutting edge 5 and the minor cutting edge 6 whose positions are different in the direction of the insert center line C. Likewise, in a side view that is viewed from the direction facing the side face 3, the wiper edge 7 and the corner edge 8 are formed to connect the major cutting edge 5 and the minor cutting edge 6, which are adjacent thereto, in an S-shape.

Figure 5:
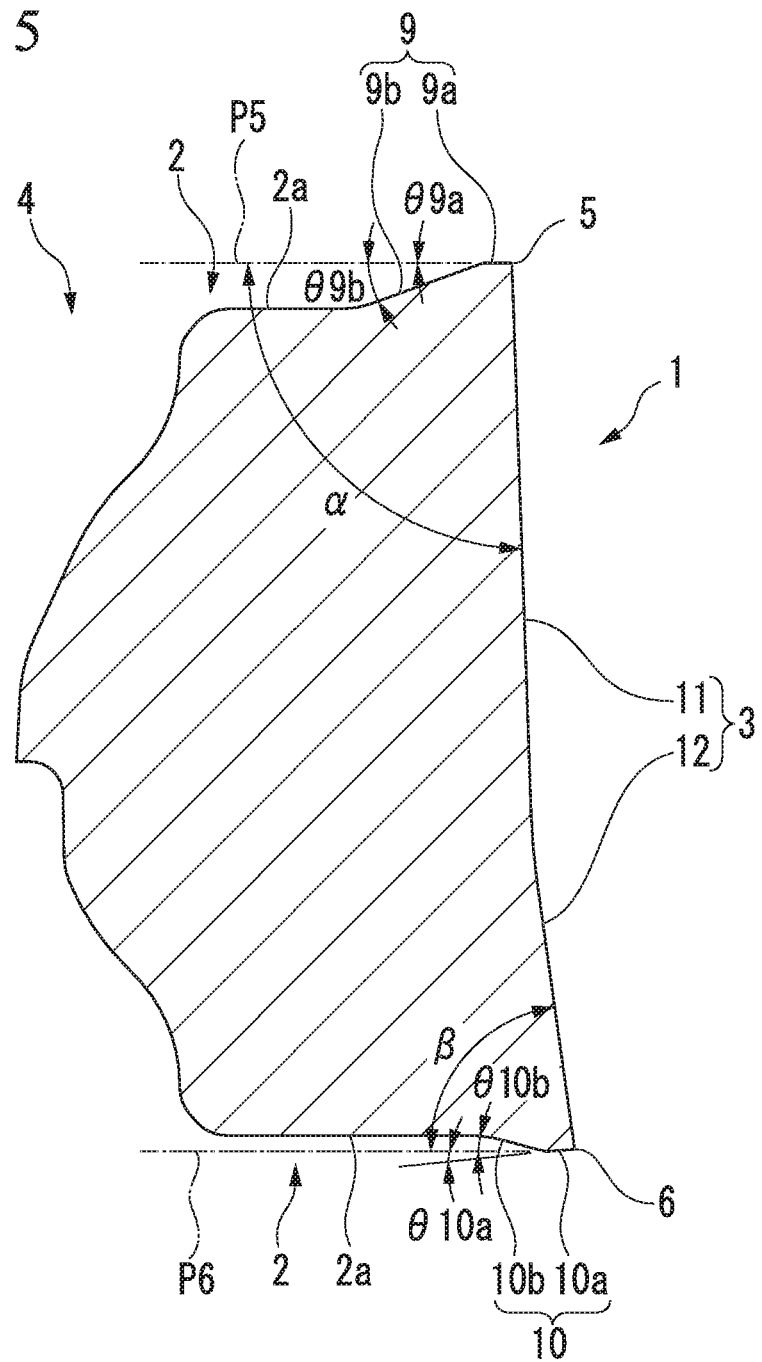
FIG. 5 is an enlarged cross-sectional view taken along line Y-Y in FIG. 2.
Figure 6:
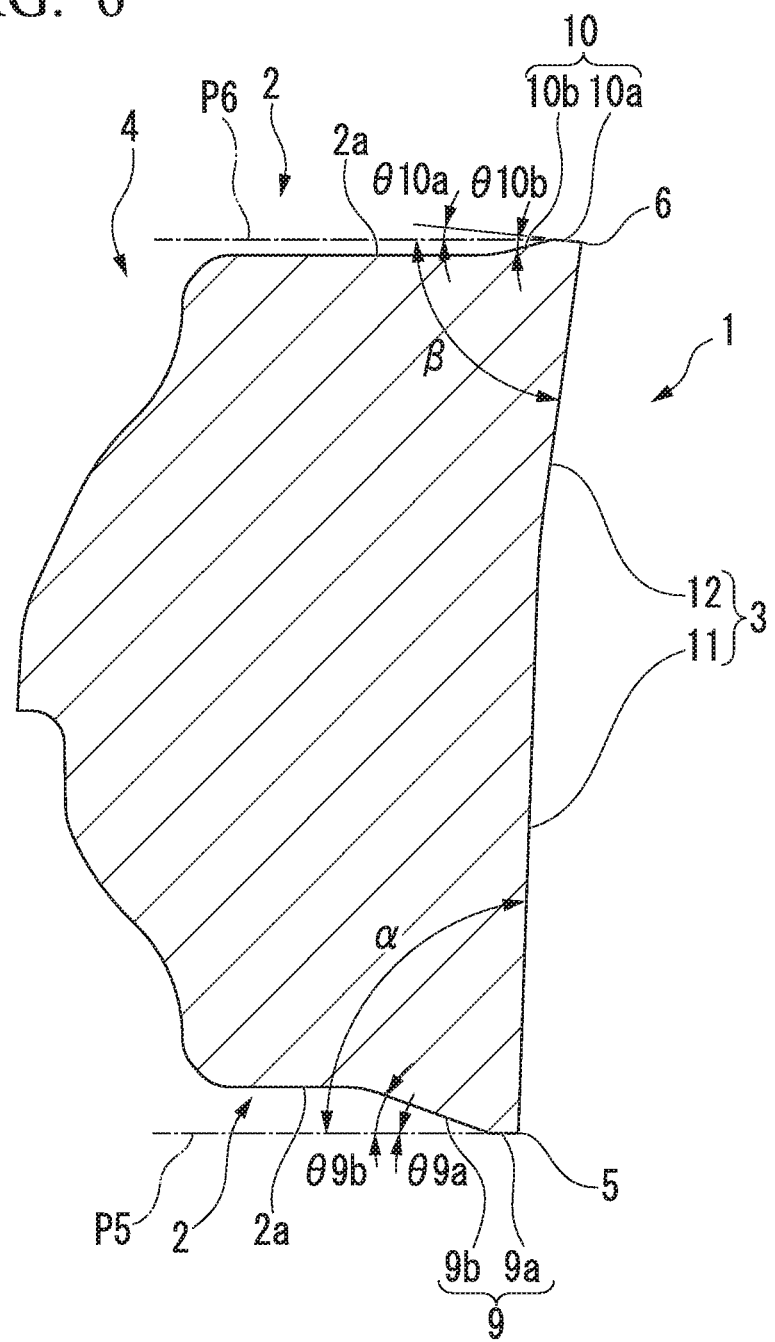
FIG. 6 is an enlarged cross-sectional view taken along line Z-Z in FIG. 2.
Figure 7:
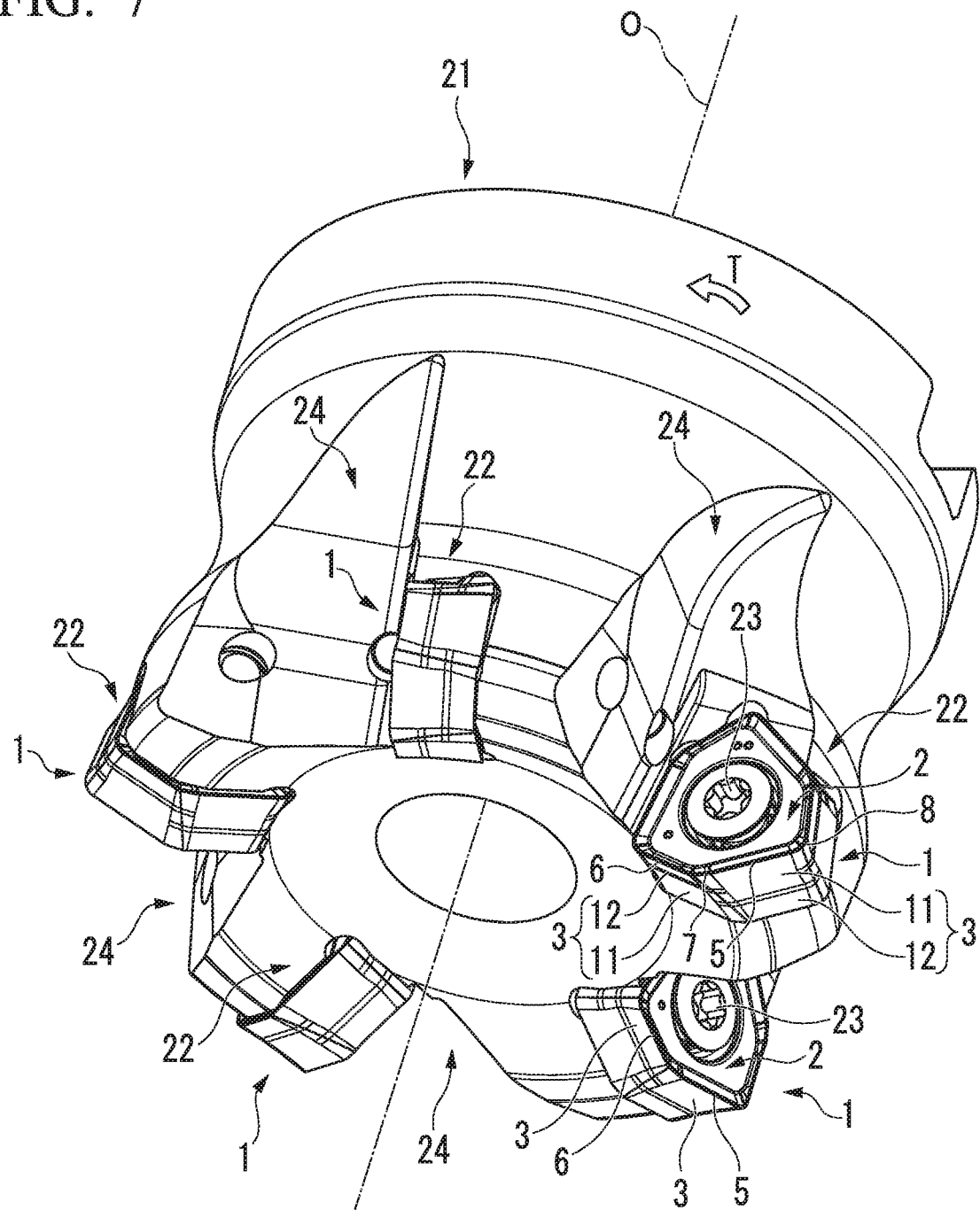
FIG. 7 is a perspective view showing an embodiment of a indexable cutting tool of the present invention to which the cutting insert of the embodiment shown in FIG. 1 is attached.
Figure 8:
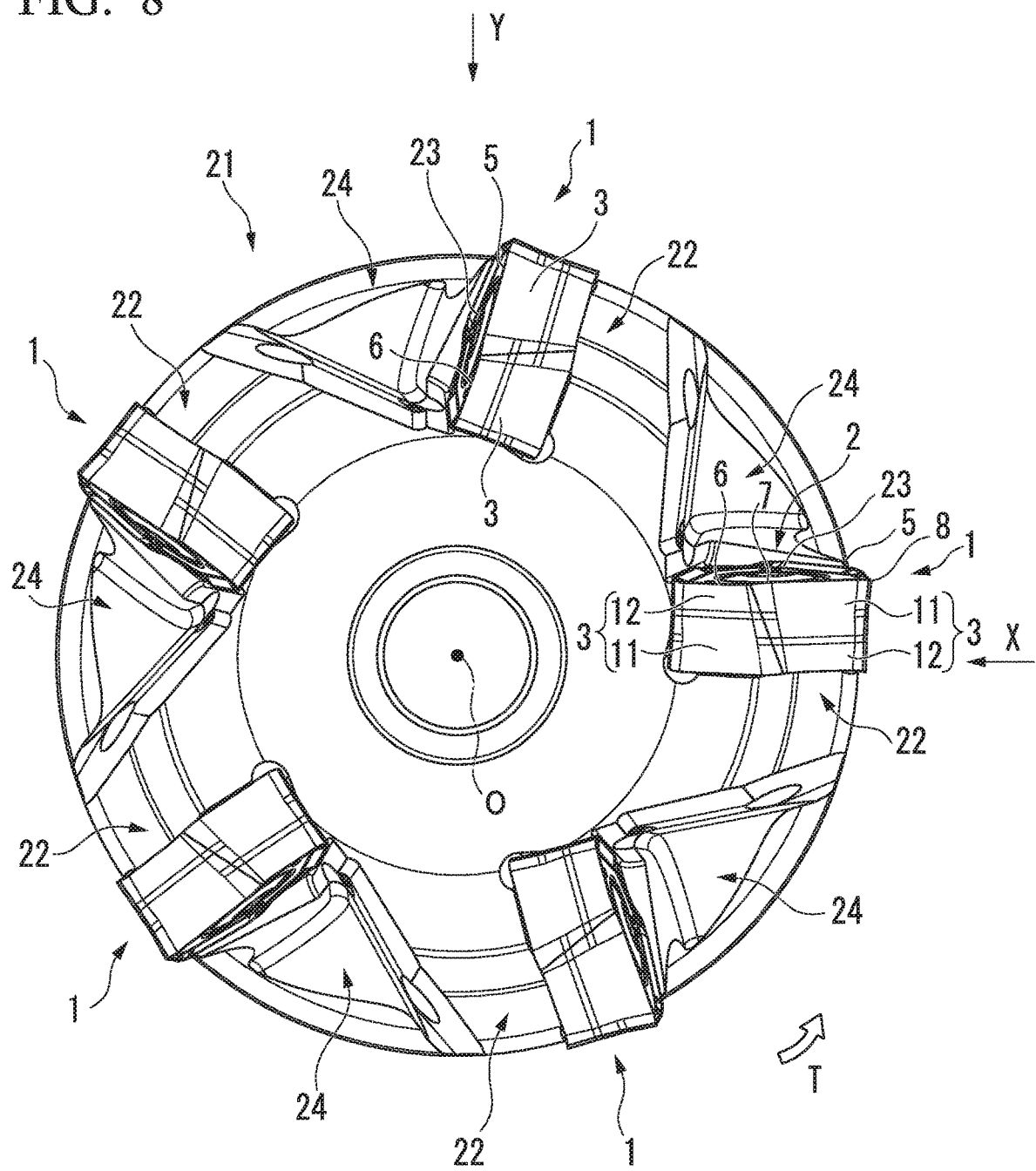
FIG. 8 is a bottom view of the embodiment shown in FIG. 7.
Figure 9:
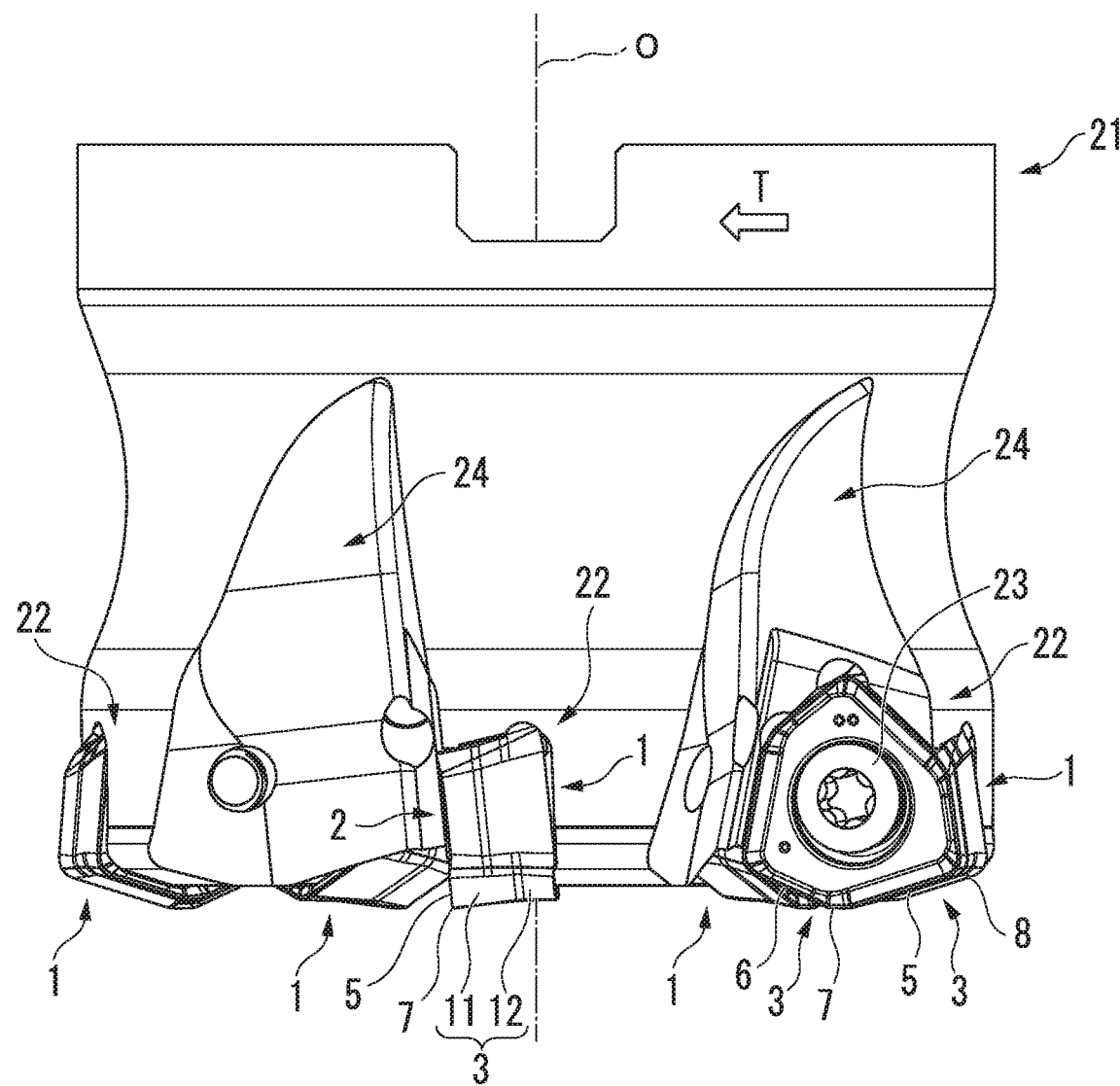
FIG. 9 is a side view in a direction of an arrow X in FIG. 8.
Figure 10:
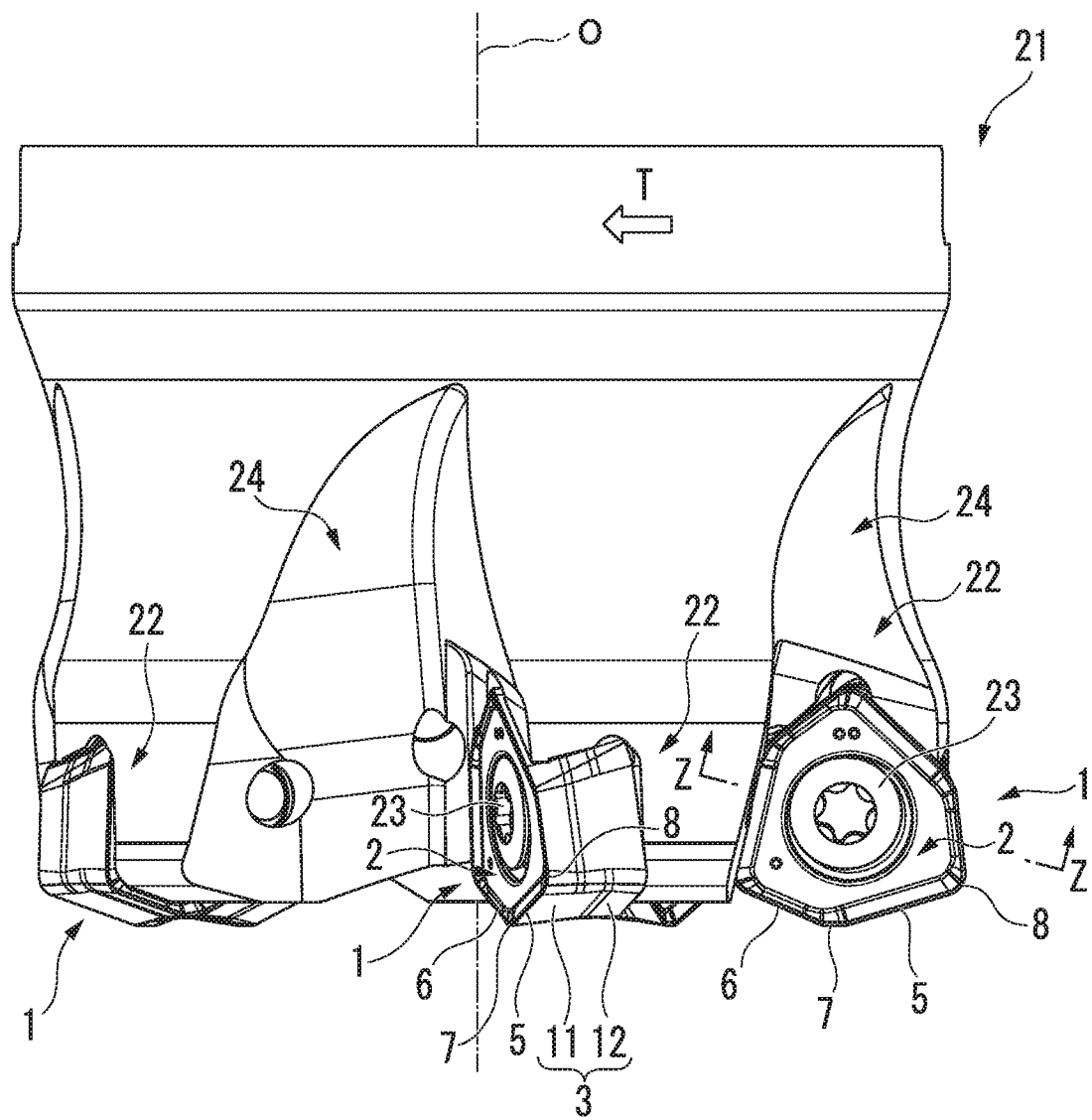
FIG. 10 is a side view in a direction of an arrow Y in FIG. 8.

A central portion of the hexagonal face 2 in the vicinity of the opening of the mounting hole 4 is formed of a flat portion 2a, which is perpendicular to the insert center line C. In contrast, in the present embodiment, as shown in FIGS. 5 and 6, a peripheral portion of the hexagonal face 2 is formed by a plurality of planes whose rake angles with respect to the planes P5 and P6, which are perpendicular to the insert center line C, are increased in stages toward the positive angle side as the planes become distant from the major cutting edge 5 and the minor cutting edge 6 toward the flat portion 2a, a portion connected to the major cutting edge 5 is formed of a major rake face 9, and a portion connected to the minor cutting edge 6 is formed of an minor rake face 10.

Here, in the present embodiment, the major rake face 9 and the minor rake face 10 are formed by two stages of planes including a first major rake face 9a and a first minor rake face 10a, which are narrow land portions connected to the major cutting edge 5 and the minor cutting edge 6, respectively, and a second major rake face 9b and a second minor rake face 10b that have a wider width and are connected from the first major rake face 9a and the first minor rake face 10a to the flat face of the central portion of the hexagonal face 2. A rake angle θ9a of the first major rake face 9a is 0°, and a rake angle θ10a of the first minor rake face 10a is a negative angle. The second major rake face 9b and the second minor rake face 10b are positive rake faces whose rake angles θ9b and θ10b are positive angles. When the positive angle side is made large, the relations including θ9a<θ9b, θ10a<θ10b, θ9a>θ10a, and θ9b>θ10b are established.

When viewed from the direction facing the hexagonal face 2, the widths of the first major rake face 9a and the first minor rake face 10a, which are negative lands, are substantially equal, the width of the second major rake face 9b is wider than that of the second minor rake face 10b, and each of the widths is substantially constant. A plurality of (two) rake faces whose rake angles with respect to the planes, which are perpendicular to the insert center line C, are increased in stages toward the positive angle side as the planes approach the flat portion 2a are formed also at inner peripheral sides of the wiper edge 7 and the corner edge 8, and by at least the rake angles of the planes and, when necessary, the widths thereof changing along the wiper edge 7 and the corner edge 8, the major rake face 9 and the minor rake face 10 are smoothly continuous with each other.

Figure 2:
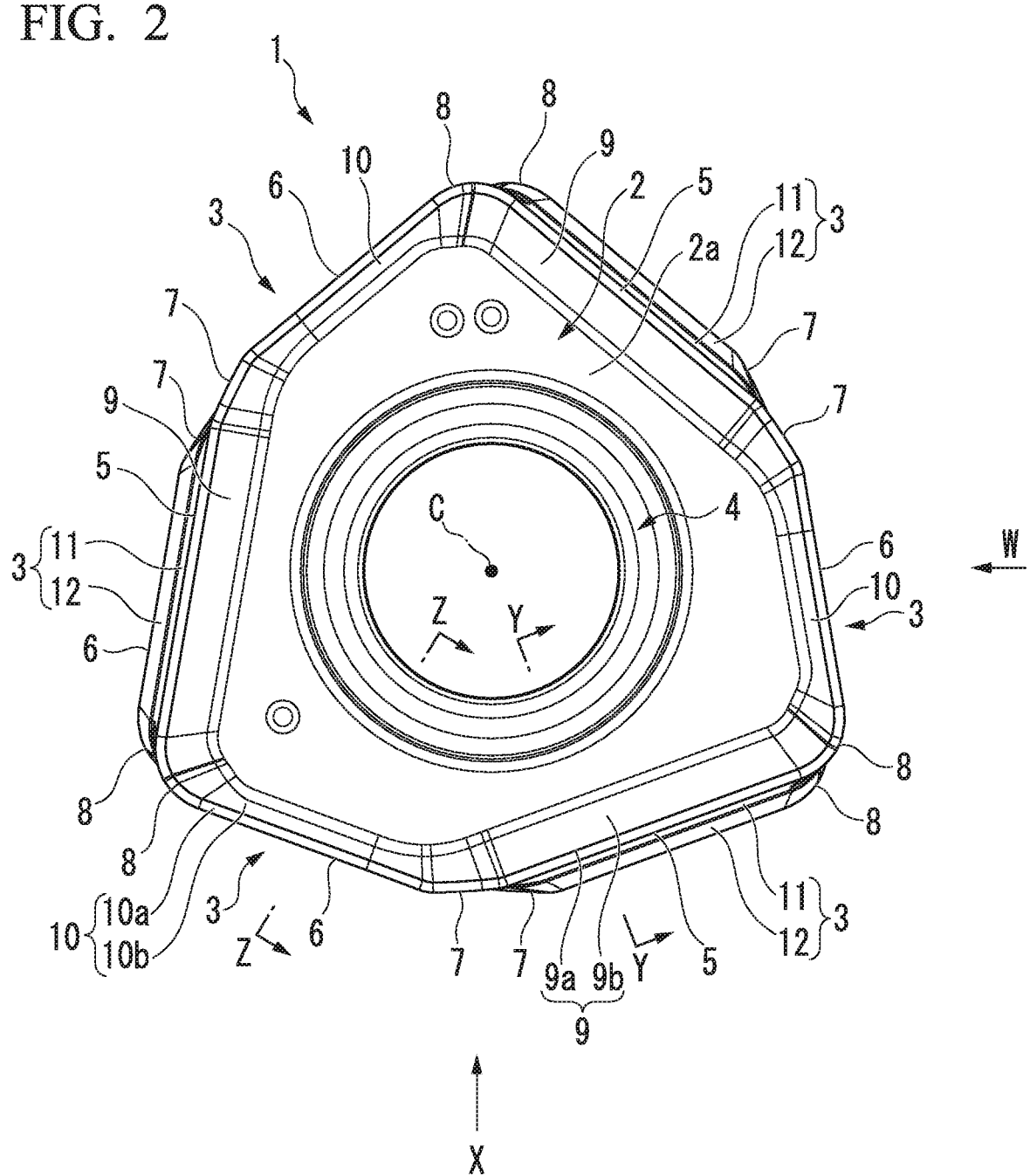
FIG. 2 is a plan view of the embodiment shown in FIG. 1.

By satisfying the above relations, and as described above, the plane P5, which is perpendicular to the insert center line C, at which the major cutting edge 5 is located being located further outward than the plane P6 at which the minor cutting edge 6 is located, as shown in FIG. 2, an outer shape of the flat portion 2a of the central portion of the hexagonal face 2 is an irregular hexagonal shape which is substantially similar to the irregular hexagon formed by the hexagonal face 2 itself.

At the side face 3 of the insert major body 1, a major flank face 11 connected to the major cutting edge 5 and an minor flank face 12 connected to the minor cutting edge 6 are formed. The major flank face 11 and the minor flank face 12 are concavely folded at a cross-section along the insert center line C as shown in FIGS. 5 and 6, and in the present embodiment, a major flank face angle α formed by the major flank face 11 with respect to the plane P5 is an obtuse angle, and an minor flank face angle β formed by the minor flank face 12 with respect to the plane P6 is an acute angle.

The major flank face 11 and the minor flank face 12 being concavely folded at the cross-section along the insert center line C means that a cross-sectional shape is concavely folded toward the insert central axis C in a region between the major flank face 11 and the minor flank face 12.

That is, the side faces 3 are formed to protrude in two stages outside the insert major body 1, from the major cutting edge 5 at one hexagonal face 2 side toward the minor cutting edge 6 at the other hexagonal face 2 side. Therefore, as shown in FIG. 2, when viewed from the direction facing the hexagonal face 2 along the insert center line C, the minor cutting edge 6 formed at a single side face 3 protrudes toward the outside of the insert major body 1 more than the major cutting edge 5 (for example, the minor cutting edge 6 protrudes within the range of 0.5% to 15% of the maximum diameter of the hexagonal face, and more preferably, within the range of 1% to 7.5% thereof). Further, the sum (α+β) of the major flank face angle α and the minor flank face angle β is smaller than 180°. In the present embodiment, the major flank face 11 and the minor flank face 12 are each formed by a single plane, and a width of the major flank face 11 in the direction of the insert center line C is larger than the width of the minor flank face 12.

Such a cutting insert is detachably attached to an insert mounting seat 22 formed at an outer periphery of a distal end portion of a tool major body 21, which is rotated in a tool milling direction T around its axial line O, by a clamp screw 23, and is used for a ramping process or the like using a set of a major cutting edge 5, an minor cutting edge 6, a wiper edge 7, and a corner edge 8. The tool major body 21 is formed in a substantially cylindrical outer shape about the axial line O, and has a chip pocket 24 extending to a rear end side formed at the outer periphery of the distal end portion thereof. At a wall face directed in the tool milling direction T of the chip pocket 24, the insert mounting seat 22 is formed as a recess opened at the wall face and a distal end face and an outer peripheral face of the tool major body 21. In the present embodiment, a plurality (five) of chip pockets 24 and insert mounting seats 22 are formed at equal intervals in the circumferential direction.

Figure 12:
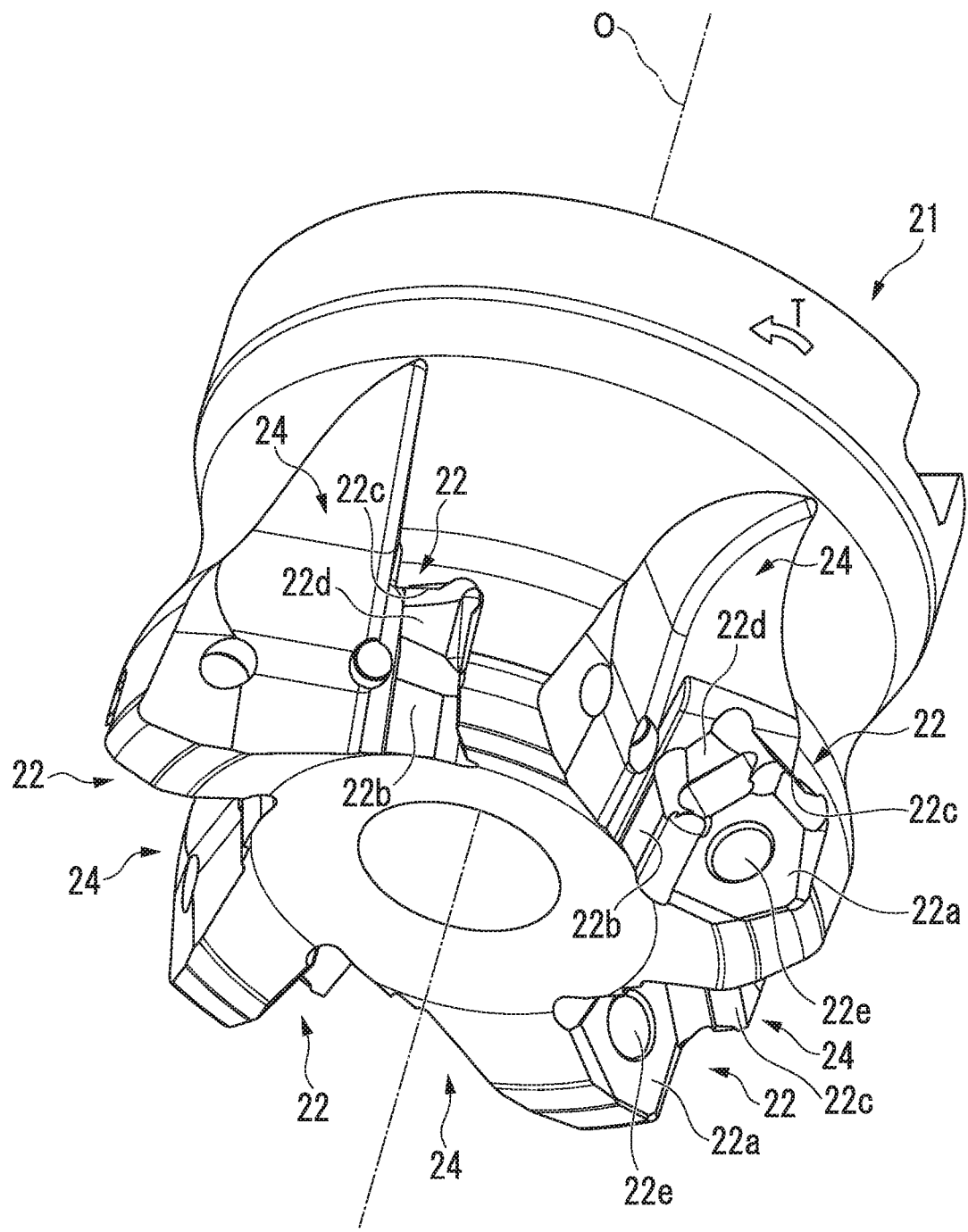
FIG. 12 is a perspective view showing a tool major body with the cutting insert removed in the embodiment shown in FIG. 7.

As shown in FIG. 12, the insert mounting seat 22 includes a flat bottom face 22a directed in the tool milling direction T, a wall face 22b that stands in the tool milling direction T to form an acute angle with respect to the bottom face 22a and is directed toward the outer peripheral side of the tool major body 21, a wall face 22c directed toward the distal end side, and a wall face 22d directed toward the outer peripheral side of the distal end. The bottom face 22a is slightly inclined to be directed in the tool milling direction T toward the rear end side of the tool major body 21, and has a screw hole 22e into which the clamp screw 23 is screwed formed at a central portion thereof. A clearance portion that prevents interference with the insert major body 1 is formed at corner portions between the bottom face 22a and the wall faces 22b to 22d and between the adjacent wall faces 22b to 22d and at intersecting ridgeline portions between the bottom face 22a and the distal end face and the outer peripheral face of the tool major body 21.

The cutting insert of the above embodiment is seated in such an insert mounting seat 22 in such a way that a single hexagonal face 2 of the insert major body 1 is directed in the tool milling direction T, and of the two major cutting edges 5 and minor cutting edges 6 which are adjacent to each other in the circumferential direction of the single hexagonal face 2, the major cutting edges 5 are made to protrude to the outer peripheral side of the distal end to be directed toward the rear end side toward the outer peripheral side of the tool major body 21, and the minor cutting edges 6 are made to protrude to the inner peripheral side of the distal end to be directed toward the distal end side toward the outer peripheral side of the tool major body 21. The wiper edge 7 between the major cutting edge 5 and the minor cutting edge 6 protrudes to the distal end side of the tool major body 21 and is located on a plane that is perpendicular to the axial line O. The corner edge 8 connected to the major cutting edge 5 protrudes to the outermost periphery of the tool major body 21, and the minor cutting edge 6 connected to the corner edge 8 is disposed to be directed toward the inner peripheral side toward the rear end side of the tool major body 21.

Figure 11:
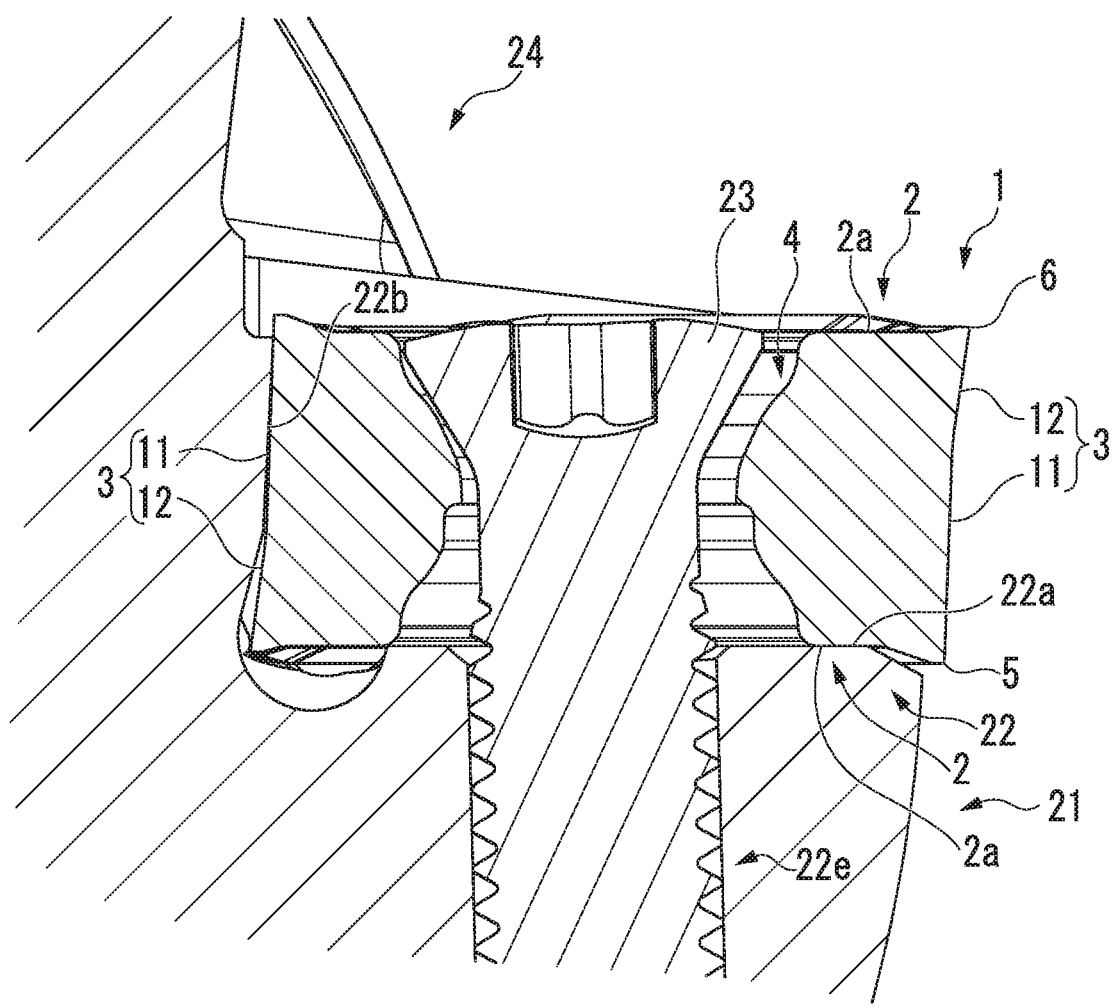
FIG. 11 is an enlarged cross-sectional view taken along line Z-Z in FIG. 10.

As shown in FIG. 11, in the hexagonal face 2 opposite the single hexagonal face 2, the flat portion 2a of the central portion is in close contact with the bottom face 22a of the insert mounting seat 22, and the major flank face 11 connected to the two remajoring major cutting edges 5 in the single hexagonal face 2 except for the major cutting edge 5 protruding to the outer peripheral side of the distal end of the tool major body 21 is in contact with the wall faces 22b and 22c of the insert mounting seat 22. Thus, the wall face 22d between the wall faces 22b and 22c does not come into contact with the seated insert major body 1, and the side faces 3 may have a slight interval therebetween.

From this state, by inserting the clamp screw 23 into the mounting hole 4 and screwing the clamp screw 23 into the screw hole 22e, the insert major body 1 is pressed toward the bottom face 22a, pressed also toward the wall face 22d, and fixed so that the insert major body 1 is detachably attached to the insert mounting seat 22.

Here, by the bottom face 22a being inclined as described above, a clearance angle directed toward the rear end side of the tool major body 21 from the minor cutting edge 6 and the major cutting edge 5 toward a side opposite the tool milling direction T is given to the major flank face 11 at which the major flank face angle α is an obtuse angle as well as to the minor flank face 12 at which the minor flank face angle β is an acute angle. Because of this, interference with a work material can be avoided not only during a high-feed planar milling process in which the tool major body 21 is fed in a direction perpendicular to the axial line O, but also in the case of a ramping process in which the tool major body 21 is fed obliquely to the distal end side in the direction of the axial line O.

When the cutting insert with the above-described constitution is attached to the indexable cutting tool, since the major flank face 11 and the minor flank face 12 are concavely folded at a cross-section along the insert center line C of a single side face 3, the major flank face angle α and the minor flank face angle β may be set separately from each other. Because of this, even when the minor flank face angle β is made small to more reliably prevent interference with the work material, a situation in which the major flank face angle α is increased as a result and the major flank face 11 interferes with the work material does not occur.

That is, since, by concavely folding the major flank face 11 and the minor flank face 12, the sum of the major flank face angle α and the minor flank face angle β in the single side face 3 can be made smaller than 180°, a large clearance angle can be given also to the minor flank face 12 while securing the clearance angle of the major flank face 11 even without further inclining the bottom face 22a of the insert mounting seat 22 in the indexable cutting tool for slopes of the planes P5 and P6, which are perpendicular to the insert center line C of the insert major body 1, to be increased. Therefore, as described above, an excessive increase in the axial rake angles of the major cutting edge 5 and the minor cutting edge 6 toward the negative angle side can be avoided while the cutting insert is attached to the insert mounting seat 22, the major cutting edge 5 and the minor cutting edge 6 can demonstrate sharp cutting performance, and an increase in cutting resistance can be prevented.

In the present embodiment, when viewed from the direction facing the hexagonal face 2 along the insert center line C, the minor cutting edge 6 formed at the single side face 3 protrudes to the outside of the insert major body 1 more than the major cutting edge 5. Because of this, when the insert major body 1 is attached to the insert mounting seat 22 as described above, since a sufficient outer peripheral clearance amount can also be secured for the minor flank face 12 of the minor cutting edge 6 directed toward the outer peripheral side of the tool major body 21 and disposed to be directed toward the inner peripheral side toward the rear end side, and the major flank face 11 concavely folded and connected to the minor flank face 12, there is no need to increase a radial rake angle of the minor cutting edge 6 toward the negative angle side even in the case of performing a deep cutting process, a ramping process, or an engraving process in which even a distal end portion of the minor cutting edge 6 directed toward the outer peripheral side of the tool major body 21 is used in cutting. Thus, sharp cutting performance can be secured, and the cutting resistance can be reduced.

Although each of the major flank face 11 and the minor flank face 12 is formed by a single plane in the present embodiment, each of the major flank face 11 and the minor flank face 12 may also be formed by a plurality of planes or curved surfaces or a single curved surface, and the side face 3 itself may be formed by a single curved surface, and the major flank face 11 and the minor flank face 12 may be concavely curved. Although the major cutting edge 5 and the minor cutting edge 6 are formed in a linear shape, like the wiper edge 7, the major cutting edge 5 and the minor cutting edge 6 may also be formed in a convexly curved shape whose radius is sufficiently large when viewed from the direction facing the hexagonal face 2.

Although the major rake face 9 and the minor rake face 10 connected to the major cutting edge 5 and the minor cutting edge 6 are formed at the two hexagonal faces 2 that intersect the major flank face 11 and the minor flank face 12 with the major cutting edge 5 and the minor cutting edge 6 interposed therebetween, in the present embodiment, the rake angles $\theta 9a$, $\theta 9b$ of the first and second major rake faces $9a$ and $9b$ forming the major rake face 9 and the rake angles $\theta 10a$ and $\theta 10b$ of the first and second minor rake faces $10a$ and $10b$ forming the major rake face 9 have the relations including $\theta 9a > \theta 10a$ and $\theta 9b > \theta 10b$, and the rake angles $\theta 10a$ and $\theta 10b$ of the minor rake face 10 are larger toward the negative angle side than the rake angles $\theta 9a$ and $\theta 9b$ of the major rake face 9.

Because of this, since, even in the case in which the minor flank face angle β of the minor flank face 12 is made large as described above, a decrease in a edge angle of the minor cutting edge 6, which is an intersecting angle between the minor flank face 12 and the minor rake face 10, can be prevented, the cutting edge strength of the minor cutting edge 6 can be secured, and occurrence of chipping or defects in the minor cutting edge 6 can be prevented even in the case of using the minor cutting edge 6 during a ramping process.

Although the major rake face 9 and the minor rake face 10 are formed in two stages including the first major rake face $9a$ and the first minor rake face $10a$, which are land portions, and the second major rake face $9b$ and the second minor rake face $10b$ in the present embodiment, the major rake face 9 and the minor rake face 10 may also be a single rake face, and at least one of the first major rake face $9a$ and the first minor rake face $10a$ may be a positive land.

Particularly, in this way, the rake angles $\theta 10a$ and $\theta 10b$ of the minor rake face 10 are made larger than the rake angles $\theta 9a$ and $\theta 9b$ of the major rake face 9 toward the negative angle side. Further, in the present embodiment, in a side view that is viewed from the direction facing the two side faces 3 adjacent in the circumferential direction, the major cutting edge 5 is formed to protrude in the direction of the insert center line C more than the minor cutting edge 6. Since this allows positions at which the major rake face 9 and the minor rake face 10 reach the flat portion 2*a*, which is perpendicular to the insert center line C, when viewed from the direction facing the hexagonal face 2 to be substantially aligned, chips generated by the major cutting edge 5 and the minor cutting edge 6 can be smoothly guided to the flat portion 2*a* and efficiently discharged during a ramping process as well as a planar milling process. Although the major cutting edge 5 and the minor cutting edge 6 have a linear shape even when viewed from the direction facing the side face 3 in the present embodiment, at least one of the major cutting edge 5 and the minor cutting edge 6 may have a curved shape.

In the cutting insert of the present embodiment, as described above, the major flank face angle α is an obtuse angle and the minor flank face angle β is an acute angle, and when the insert major body 1 is attached to the insert mounting seat 22, the major flank face 11 connected to the two remajoring major cutting edges 5 except for the major cutting edges 5 used in cutting among the major cutting edges 5 of a single hexagonal face 2 directed in the tool milling direction T is in contact with the wall faces 22*b* and 22*c*.

Since, with respect to the major flank face angle α being an obtuse angle, the wall faces 22*b* and 22*c* extend in a direction intersecting the bottom face 22*a* of the insert mounting seat 22 at an acute angle, as shown in FIG. 11, the wall faces 22*b* and 22*c* come into contact with the major flank face 11 to slightly cover the major flank face 11. Thus, lifting and the like of the insert major body 1 due to the cutting resistance acting on the major cutting edge 5 or the minor cutting edge 6 used in cutting can be prevented, and stable cutting can be performed even during a ramping process or a general high-feed planar milling process.

In the present embodiment, in the case in which, as described above, the major flank face 11 is brought into contact with the wall faces 22*b* and 22*c* of the insert mounting seat 22, the width of the major flank face 11 is made larger than the width of the minor flank face 12 in the direction of the insert center line C. Because of this, since a large contact area of the insert major body 1 with the wall faces 22*b* and 22*c* of the insert mounting seat 22 can be ensured, the insert major body 1 can be more reliably attached to the insert mounting seat 22, and a cutting process can be more stably performed.

INDUSTRIAL APPLICABILITY

A ramping process using a cutting insert can be more efficiently performed.

REFERENCE SIGNS LIST

1 Insert major body
2 Hexagonal face
2*a* Flat portion
3 Side face
4 Mounting hole
5 Major cutting edge
6 Minor cutting edge
7 Wiper edge
8 Corner edge
9 Major rake face
9*a* First major rake face
9*b* Second major rake face
10 Minor rake face
10*a* First minor rake face
10*b* Second minor rake face
11 Major flank face
12 Minor flank face
21 Tool major body
22 Insert mounting seat
22*a* Bottom face
22*b* to 22*d* Wall face
23 Clamp screw
C Insert center line
P5, P6 Planes perpendicular to insert center line C
α Major flank face angle
β Minor flank face angle
θ9a Rake angle of first major rake face 9*a*
θ9b Rake angle of second major rake face 9*b*
θ10a Rake angle of first minor rake face 10*a*
θ10b Rake angle of second minor rake face 10*b*
O Axial line of tool major body 21
T Tool milling direction

The invention claimed is:

1. A cutting insert comprising:
an insert major body including two hexagonal faces, a front hexagonal face and a back hexagonal face, facing away from each other and six side faces arranged around the two hexagonal faces, wherein:
the insert major body is formed to be rotationally symmetrical at 120° intervals about an insert center line passing through centers of the two hexagonal faces;
a first cutting edge at an intersection of the six side faces and the front hexagonal face, and a second cutting edge at an intersection of the six side faces and the back hexagonal face, the first cutting edge including exactly three major cutting edges and exactly three minor cutting edges with the major cutting edges alternating with the minor cutting edges in a circumferential direction, and the second cutting edge including exactly three major cutting edges and exactly three minor cutting edges with the major cutting edges alternating with the minor cutting edges in the circumferential direction;
a first three side faces of the six side faces each having
one of the major cutting edges of the first cutting edge, and
one of the minor cutting edges of the second cutting edge;
a second three side faces of the six side faces each having
one of the major cutting edges of the second cutting edge, and
one of the minor cutting edges of the first cutting edge;
wherein the first three side faces alternate with the second three side faces in the circumferential direction;
each side face having a major flank face connected to the major cutting edge and a minor flank face connected to the minor cutting edge;
in each of the six side faces the major flank face intersects the minor flank face to form a concave single curved surface in a cross-section view along the insert center line;
in each of the six side faces, a sum of a major flank face angle α formed by the major flank face with respect to a plane which is perpendicular to the insert center line intersecting the major cutting edge and a minor flank face angle β formed by the minor flank face with respect to a plane which is perpendicular to the insert center line intersecting the minor cutting edge is smaller than 180°, the major flank face angle α is an obtuse angle;

in a view parallel to the insert center line of the front hexagonal face from a direction facing the front hexagonal face, in each of the six side faces, the minor cutting edge protrudes in a direction perpendicular to the insert center line of the insert major body more than the major cutting edge, in each of the six side faces, a width of the major flank face is larger than a width of the minor flank face in a direction parallel to the insert center line, each of the two hexagonal faces including a central portion formed of a flat surface perpendicular to the insert center line, a major rake face at each of the three major cutting edges and a minor rake face at each of the three minor cutting edges, each minor rake face having
 a first minor rake face intersecting the minor cutting edge, and
 a second minor rake face intersecting the first minor rake face and spaced apart from the minor cutting edge,
 wherein the first minor rake face has a negative rake angle and the second minor rake face has a positive rake angle;

wherein, the plane intersecting the major cutting edges of each hexagonal face protrudes further from an insert mid-plane perpendicular to the insert center line than the plane intersecting the minor cutting edges of the respective hexagonal face.

2. The cutting insert according to claim 1, further comprising
 each major rake face having
  a first major rake face intersecting the major cutting edge, and
  a second major rake face intersecting the first major rake face and spaced apart from the major cutting edge,
 wherein the first major rake face has a rake angle, the second major rake face has a rake angle, the rake angles being different from each other.

3. The cutting insert according to claim 2, wherein the first major rake angle is 0° and the second major rake angle is positive.

4. An indexable cutting tool comprising:
 an insert mounting seat formed at an outer periphery of a distal end portion of a tool major body which, in use, is rotated around an axial line of the tool major body,
 wherein the cutting insert according to claim 1 is detachably attached to the insert mounting seat.

* * * * *